March 25, 1958     H. M. ZIMMERMAN     2,828,218
ENAMELING COMPOSITION AND PROCESS
Filed Feb. 10, 1954
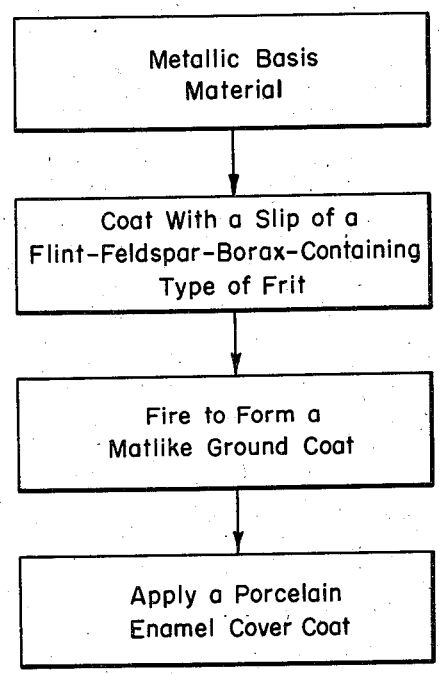
INVENTOR.
Haven M. Zimmerman
BY
ATTORNEYS.

2,828,218

ENAMELING COMPOSITION AND PROCESS

Haven M. Zimmerman, Dunbar, W. Va., assignor to The Fletcher Enamel Company, Dunbar, W. Va., a corporation of West Virginia Application February 10, 1954, Serial No. 409,539

3 Claims. (Cl. 117—70)

This invention relates to a composition of matter and a process for preparing a metallic surface for porcelain enameling. More particularly, this invention relates to a process wherein a very thin coating of a composition of matter (enamel) on a steel surface is fired so as to form a uniform mat coating in which oxides of iron are bonded with glass.

In the past, it has been thought necessary to have a uniform continuous glass coating on the metallic surface as a ground coat for the application of a suitable porcelain enamel cover coat. A glassy coat was thought to be necessary to provide adherence of the cover coat to the metallic basis material and to eliminate reactions which would otherwise occur between the cover coat and the basis metal. Further, it was thought that glassy coatings would tend to flow and remedy any defects in the surface of the basis metal.

The earlier prior art employed materials known in the art as porcelain enamel cast iron ground coats. These ground coats used very large amounts of relatively infusible materials such as silica and feldspar. The cast iron ground coats were unsatisfactory for various reasons, such as high cost, the undesirable thickness of coating necessary to provide sufficient adhesion to the metallic basis material, and the poor bond between the thick ground coat and the metallic surface.

The later art used a ground coating composition known as a porcelain enamel sheet steel ground coat. This class of ground coat enamels was characterized by the fact that they consisted essentially of fusible materials which, when fired, resulted in a completely fused, glasslike surface. Variations in the application of the sheet steel ground coat included applying a relatively thin layer of coating prior to firing, firing for a longer time and at a higher temperature than normal, and using smaller amounts of the metallic oxides which were normally thought to increase the adhering properties of the ground coat. The sheet steel ground coats were unsatisfactory for reasons similar to those reasons which rendered the cast iron ground coats unsatisfactory, that is, the high cost of using metallic oxides and the poor adherent properties, together with there being no significant increase in corrosion resistance. Further, even using the sheet steel ground coat, it was generally necessary to pickle or nickel plate the metallic basis material prior to coating in order to promote adherence of the color cover coat.

The terms "metallic surface" and "metallic basis material" are intended to include steel, cast iron, copper, etc.

Therefore, it is an object of this invention to provide a composition of matter for preparing a metallic surface for porcelain enameling which will produce a corrosion-resistant surface to which a conventional cover coat will satisfactorily adhere.

Further, it is an object of this invention to provide a composition of matter for preparing a metallic surface for porcelain enameling which does not require the use of metallic oxides, such as the oxides of cobalt, nickel, and manganese.

Still further, it is an object of this invention to provide a process for preparing a metallic surface for porcelain enameling.

Still further, it is an object of this invention to provide a process for producing enameled metallic articles.

Other objects and advantages of the present invention will be apparent in view of the following detailed disclosure and description thereof.

In the practice of this invention, a new composition of matter, that is a frit, is prepared with conventional mill additions to form a liquid slip or enameling composition, which is applied to a metallic surface to a weight per side of about ⅛ to ⅜ oz. per square foot dry weight. The metallic basis material thus coated with an enameling composition is then fired from 3 minutes to 8 minutes at a temperature of from 1300° F. to 1700° F. When cooled to a handling temperature, the metallic basis material is coated with a porcelain enamel cover coat and fired again to produce an enameled metallic article.

Various flint-feldspar-borax containing frit compositions have been made which can be used satisfactorily in the preparation of a metallic surface for porcelain enameling. Set forth below are two specific examples of such frit, which are prepared in accordance with the practice of this invention, and a range of compositions.

*Frit composition—Parts by weight*

|  | 8A | 10A | Range |
|---|---|---|---|
| Flint | 144 | 124 | 110–160 |
| Feldspar | 376 | 306 | 290–390 |
| Dehydrated Borax | 320 | 321 | 300–340 |
| Soda Ash | 22 | 62 | 15–75 |
| Sodium Nitrate | 29 | 69 | 15–80 |
| Fluorspar | 73 | 82 | 60–90 |
| Calcspar | 12 | 12 | 9–15 |
| Red Iron Oxide | 3.4 | 2.5 | up to 5.0 |

In the above frit compositions, the oxides of cobalt, nickel, and manganese may be used, but are not required.

The materials set forth in the foregoing table are the raw-batch composition. After mechanical mixing of the materials, the batch is smelted at about 2400° F. and fritted by pouring into a water bath.

The frit thus formed is then milled in a ball mill, together with suitable mill additions, to form the liquidlike slip which is applied to the steel surface being prepared for porcelain enameling.

By way of illustration, a slip, which has been found to be satisfactory for the practice of this invention, is now described: the slip is prepared by grinding in a ball mill 58 pounds of 8A frit, 42 pounds of 10A frit, 10.75 pounds of #5 Ky. Tenn. clay, .30 pound of bentonite, .10 pound of magnesium carbonate, 5.0 pounds of feldspar, .25 pound of dehydrated borax, and 6 gallons of water. The grinding is continued until about 8 grams will remain on a 200-mesh screen from a 50 cc. sample.

The slip thus prepared is applied to the metallic surface by spraying, dipping, brushing or other suitable means. After the coating has dried, the steel article is fired until a dull, dark, rough-looking mat coating is obtained. In the practice of this invention, it has been found that a 5″ diameter pan of 29-gauge mild steel, having a .001-inch thick coating of slip, as described above, will form a uniform mat surface if fired for about 4 minutes at 1580° F. The firing time may vary from 3 minutes to 8 minutes, and the firing temperature may vary from 1300° F. to 1700° F. The optimum time and temperature is dependent upon the shape and gauge of the metallic basis material, the composition of the frit and the thickness of the slip as applied. If the coated metallic surface is overfired, there will be a loss in corrosion resistance of the enameled article. If underfired, there will be a loss in the adhesion properties of the enamel coating.

When the fired metallic basis material has cooled, it is coated by spraying, dipping, brushing or other suitable means with a convential porcelain enamel cover coat in the normal manner, and fired to produce a saleable enameled metallic article.

An advantage of this invention is the corrosion resistance of the enameled metallic article, even if the outer coat should become chipped or cracked.

Further, the use of the more costly metallic oxides of cobalt, nickel, and manganese is not required.

Still further, the outer coat is extremely adherent to the prepared surface, and there is no necessity for pickling or nickel plating the metallic basis material prior to enameling so as to insure this adherence.

Thus, the practice of this invention will result in a lower cost of production for corrosion-resistant, durable, and long-lived enameled steel articles.

While certain preferred embodiments of this invention have been described and illustrated, it will be obvious to those skilled in the art that various changes and modifications may be made in the invention as disclosed without departing from the true spirit and scope of the invention.

What is claimed is:

1. A process for preparing the surface of a metallic basis material for coating with a porcelain enamel cover coat comprising: applying to the metallic surface a coating layer of a flint-feldspar-borax containing type of enameling composition to a weight, per side, of from 1/8 to 3/8 ounce per square foot dry weight; and firing the metallic basis material for from 3 minutes to 8 minutes at a temperature of from 1300° F. to 1700° F. to form a matlike ground coat.

2. In the production of porcelain enameled articles wherein a flint-feldspar-borax-containing type of ground coat is first applied to a metallic basis material prior to applying a porcelain enamel cover coat; the improvement of applying the ground coat to a weight, per side, of from 1/8 to 3/8 ounce per square foot dry weight and firing at a temperature of from 1300° F. to 1700° F. for a time of from 3 to 8 minutes to form a matlike ground coat.

3. In the production of porcelain enameled articles wherein an enamel ground coat is first applied to a metallic basis material prior to applying a porcelain enamel cover coat: the improvement of applying a slip containing a frit comprising, by weight, 110–160 parts flint, 290–390 parts feldspar, 300–340 parts dehydrated borax, 15–75 parts soda ash, 15–80 parts sodium nitrate, 60–90 parts flourspar, 9–15 parts calcspar, and up to 5 parts red iron oxide as the ground coat, to a weight, per side, of from 1/8 to 3/8 ounce per squire foot dry weight and firing at a temperature of from 1300° F. to 1700° F. for a time of from 3 to 8 minutes to form a matlike ground coat.

References Cited in the file of this patent

UNITED STATES PATENTS

| | | |
|---|---|---|
| 1,783,738 | McKeown | Dec. 2, 1930 |
| 2,361,376 | Athy et al. | Oct. 31, 1944 |
| 2,602,758 | Olt et al. | July 8, 1952 |
| 2,734,857 | Snyder | Feb. 14, 1956 |
| 2,788,290 | Deuble | Apr. 9, 1957 |

FOREIGN PATENTS

| | | |
|---|---|---|
| 593,795 | Great Britain | Oct. 27, 1947 |

OTHER REFERENCES

Grundwald: Enameling on Iron and Steel, Charles Griffin and Co. Ltd., 1909.